United States Patent Office 3,097,545
Patented July 16, 1963

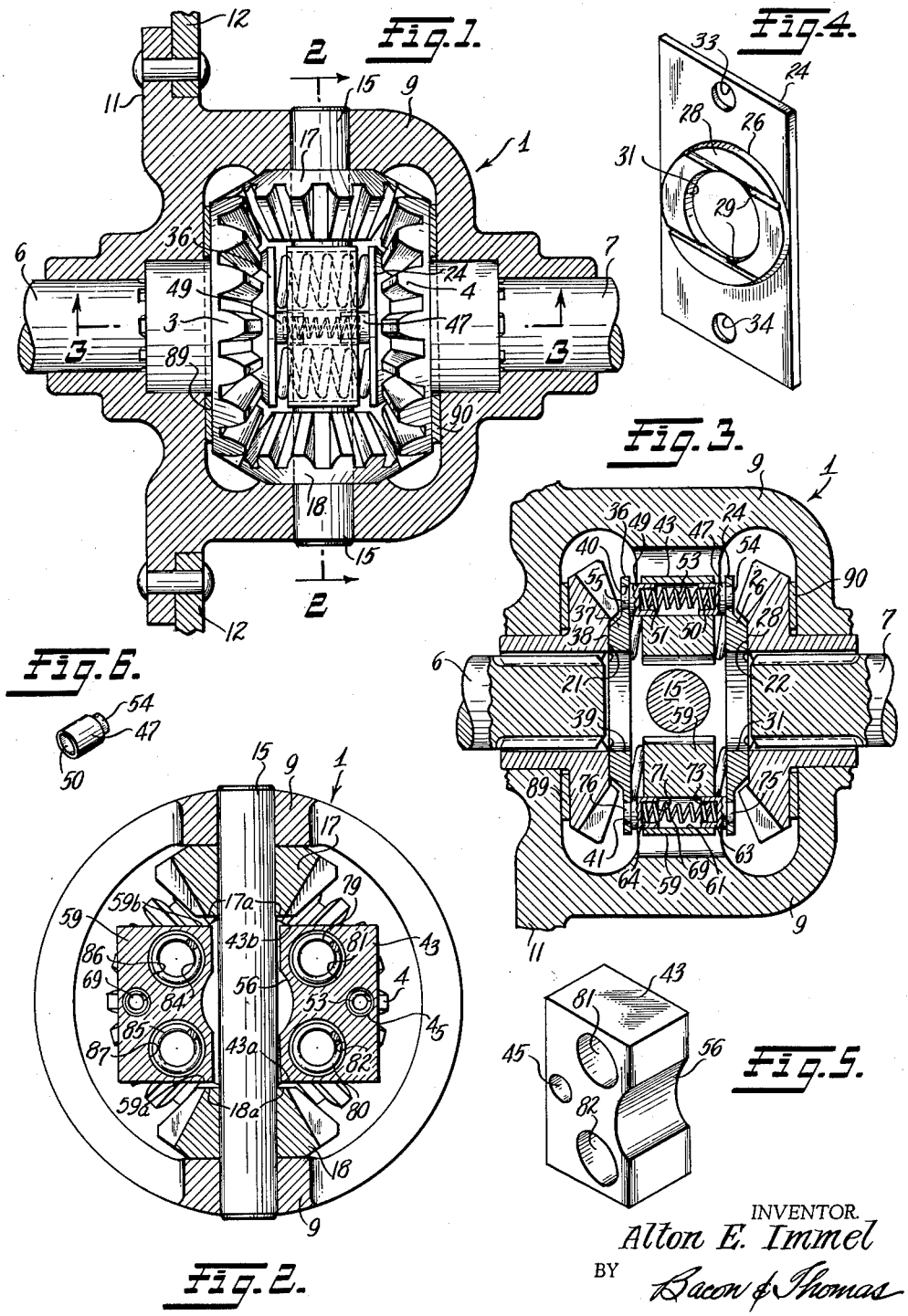

3,097,545
SLIP-RESISTANT DIFFERENTIAL
Alton E. Immel, 215 E. 14th St., Auburn, Ind.
Filed Nov. 26, 1962, Ser. No. 239,974
8 Claims. (Cl. 74—711)

This invention relates generally to a novel differential unit and more specifically to a differential of the non-slip or slip-resistant type.

It is well known in the art that there are many disadvantages in the standard type of differential which is required to accommodate this in the relative rotation of a vehicle's driven wheels when executing a turn. In the first place, when one of the driven wheels loses its traction on ice, mud or the like, its resistance is lowered to a point where it absorbs the entire amount of torque being supplied and no power is delivered to the opposite wheels to move the vehicle forward. A similar condition occurs in certain types of skids and the stabilizing effect of having the driven wheels operate together is lost.

It is, therefore, a primary object of the present invention to provide a differential unit wherein the rear axle shafts will tend to operate as a locked unit even under conditions where one of the driven wheels has lost traction.

A related object is to provide a slip-resistant differential unit of the type referred to without preventing the limited relative movement of a conventional differential action under normal conditions of turning.

Another object is to provide a slip-resistant differential unit of the type referred to above wherein the component parts are relatively simple in construction, assembly and operation and are sturdy enough to resist the wear incurred by relative movement of their frictionally-engaged surfaces.

Another object is to provide a slip-resistant differential unit which can be installed as standard equipment in automobiles or the like and one which can be produced as well by converting existing differentials.

Another object is to provide a slip-resistant differential unit which is economical to manufacture and one where worn parts can readily be replaced whenever necessary.

Other objects and advantages will be apparent from the following description when taken in conjunction with the accompanying drawings, in which:

FIG. 1 is a top plan view of a differential unit constructed in accordance with the present invention, the differential casing being shown in section;

FIG. 2 is a sectional view taken on the line 2—2 of FIG. 1;

FIG. 3 is a sectional view taken on the line 3—3 of FIG. 1;

FIG. 4 is a perspective view illustrating a friction plate of the type employed in the embodiment of FIG. 1;

FIG. 5 is a perspective view of a friction plate mounting block of the type employed in the embodiment of FIG. 1; and FIG. 6 is a perspective view illustrating a guide pin of the type employed to mount the friction plates in the embodiment of FIG. 1.

Referring now more specifically to the drawings, the differential unit, generally indicated by the numeral 1, comprises a pair of opposed side gears 3 and 4 splined onto the inner ends of the aligned rear axle shafts 6 and 7 respectively. A differential casing 9 is rotatably mounted on the axle shafts 6 and 7 in surrounding relation with respect to side gears 3 and 4. An annular external flange 11 is provided on casing 9 for mounting a ring gear 12 of the type shown fragmentarily in FIG. 1, thereby enabling the differential casing 9 to be drivingly connected with a propeller shaft (not shown). A pinion shaft 15 is secured transversely between opposite walls of the casing 9 and pinion gears 17, 18 are rotatably mounted thereon. As illustrated, gears 3, 4 and 17, 18 are beveled for intermeshing in the conventional manner and the opposed inner ends of side gears 3 and 4 are provided with centrally located flat friction faces 21, 22 respectively which are axially opposed. Friction faces 17a and 18a are also provided on the opposed inner ends of pinion gears 17 and 18, respectively.

A friction plate 24 is mounted across the inner face of side gear 4 as best illustrated in FIG. 4. The friction plate 24 is generally rectangular in configuration and has a centrally disposed circular raised portion 26 on one side thereof to provide a flat friction surface 28 for frictional engagement with the surface 22 of gear 4. Grooves 29 may be formed on the face 28 to provide for the free flow of lubricant and a central bore 31 is formed in the plate. Bore 31 is larger in diameter than the splined end of the adjacent axle to rotatably accommodate the same in the event that the inner end thereof extends past the side gear 4. A pair of apertures 33 and 34 are centrally positioned adjacent the upper and lower extremities of plate 24 for a purpose which will appear hereinafter.

A second friction plate 36 is disposed across the inner end of side gear 3 and is identical in configuration to the plate 24 although reversed for cooperation with the friction surface 21 of gear 3. Thus it will be seen that the friction plate 36 includes a circular raised portion 37 providing a flat friction surface 38 and that it is provided with a central bore 39 and upper and lower apertures 40 and 41 respectively.

A mounting block 43 is disposed between the upper portions of friction plates 24 and 36 and is provided with a centrally disposed bore 45 adjacent its upper end for alignment with apertures 33 and 40. A pair of guide pins 47, 49 are mounted in the bore 45 and are provided with opposed sockets 50, 51 in their inner ends. A compression spring 53 is disposed between the pins with its outer ends received in the sockets. The outer ends of guide pins 47 and 49 are provided with projections 54, 55 respectively which are retained in apertures 33, 40 under the force of compression spring 53. An arcuate groove 56 is provided on the lower surface of the mounting block 43 to prevent any possible interference at the inner ends of axle members 6 and 7.

A similar mounting block 59 is mounted between the lower end portions of friction plates 24 and 36, being provided with a bore 61 for receiving guide pins 63, 64. A spring 69 is positioned with its outer ends received in sockets 71, 73 in the opposed inner ends of pins 63 and 64. Spring 69 bears outwardly against the pins to hold the outer projections 75, 76 thereof in position within the apertures 34 and 41 respectively.

The opposite ends of mounting blocks 43 and 59 are provided with flat friction surfaces as indicated at 43a, 43b, 59a and 59b for cooperation with friction faces 17a and 18a, as will be described hereinafter.

A pair of heavy-duty coil springs 79, 80 are mounted in parallel bores 81, 82 disposed adjacent the inner end of mounting block 43 and the outer ends of these springs extend beyond the mounting block to bear against the adjacent surfaces of friction plates 24 and 36. A similar pair of springs 84, 85 are mounted in bores 86, 87 formed in the block 59 and bear outwardly against the adjacent surfaces of friction plates 24 and 36. Thrust washers 89, 90 are positioned between the respective side gears and the casing 9 so that the side gears can rotate freely with respect to the casing.

It will readily be apparent that torque received by the ring gear 12 is normally transferred through the differential casing 9, pinion shaft 15 and pinion gears 17, 18, and is distributed equally to shafts 6 and 7 when driving on a straight course. By means of conventional differential action when the vehicle is following a curved path, a slight rotation of the gears 17 and 18 in opposite directions will permit one of the side gears to rotate more than the other so that the respective wheel can follow a wider radius of curvature. When the wheel at the end of axle member 7 is in a resistance-free condition, a portion of the torque applied thereto is transferred to side gear 3 through the friction plate 24, the mounting blocks 47 and 59 and the friction plate 36 by virtue of the frictional engagement of surfaces 22 and 28 and surfaces 21 and 38. If gear 4 is moving in a clockwise direction as viewed in FIG. 2, the mounting blocks 43 and 59 pivot into engagement with the pinion gears 18 and 17, respectively, with surface 43a engaging friction face 18a and surface 59b engaging friction face 17a. By thus locking pinion gears 17 and 18 against rotation, any relative rotation between gears 3 and 4 is prevented.

Springs 53, 69, 79, 80, 84 and 85 are of sufficient length in their relaxed condition so that they remain under compression as wear occurs on the friction surfaces, and they continue to hold the surfaces tightly together. It should particularly be noted that the opposed surface of frictional engagement are flat and can readily accommodate a reasonable amount of wear. The heavy-duty springs retain their compressive force through an extended lifetime, but it will be readily understood that the springs and the plates can be conveniently replaced when they become worn. Prior to such replacement the friction plates and mounting blocks do not affect the normal differential functioning of the unit.

While one embodiment has been disclosed in the present application for purposes of illustration, numerous modifications may be made those skilled in the art without departing from the spirit of the invention or the scope of the annexed claims.

I claim:

1. A slip-resistant differential unit, comprising: a pair of opposed power output shafts; axially aligned differential side gears fixed in opposed relation on the inner ends of said shafts; a differential casing rotatably mounted at either side thereof with respect to the respective shafts and surrounding said side gears; ring gear means for applying power to said casing; a pinion shaft mounted transversely in said casing and extending between said side gears; a pair of pinion gears rotatably mounted on said shaft and each meshing at either side thereof with said side gears, said pinion gears being provided on their inner ends with inwardly directed friction faces; a pair of friction plates mounted between said side gears and having outwardly disposed friction faces directly aligned with corresponding faces provided on the inner ends of said side gears; means for biasing said friction plates outwardly into tight frictional engagement with said side gears; and a pair of mounting blocks connected between said friction plates and on opposite sides of said pinion shafts, said mounting blocks each being provided with friction surfaces at either end thereof for cooperation with the friction faces on the inner ends of said pinion gears, whereby relative rotation of said side gears will move said mounting blocks into engagement with the respective pinion gears to prevent rotation thereof.

2. The differential of claim 1 wherein said friction faces on said plates are annular in configuration and are disposed on annular raised portions provided on the exterior of said plates.

3. The differential of claim 2 wherein said friction plates are elongated and are connected at their ends with provision for relative axial movement, spring means being provided intermediate said ends for biasing said friction plates outwardly.

4. The differential of claim 3 wherein said mounting blocks are pivotally connected between said friction plates at either end thereof, said mounting blocks being provided with bores to receive said spring means and said friction plates and said mounting blocks being held in assembled relation by guide pins projecting from either side of each mounting block and biased outwardly into aligned apertures provided in the ends of the respective friction plates.

5. The differential of claim 4 wherein said friction plates are each provided with a central bore and have lubricant grooves extending across their friction faces for communication with said bore.

6. A slip-resistant differential unit, comprising: a pair of opposed power output shafts; axially aligned differential side gears fixed in opposed relation on the inner ends of said shafts, each of said side gears being recessed to provide a flat, annular friction face disposed radially inward of its gear teeth and axially outward of the inner extremities of said teeth; a differential casing rotatably mounted at either side thereof with respect to the respective shafts and surrounding said side gears; ring gear means for applying power to said casing; a pinion shaft mounted transversely in said casing and extending between said side gears; a pair of pinion gears rotatably mounted on said shaft and each meshing at either side thereof with said side gears, said pinion gears being provided on their inner ends with inwardly directed friction faces; a pair of friction plates mounted between said side gears and having outwardly disposed friction faces directly aligned with corresponding faces provided on the inner ends of said side gears; means for biasing said friction plates outwardly into tight frictional engagement with said side gears; and a pair of mounting blocks connected between said friction plates and on opposite sides of said pinion shafts, said mounting blocks each being provided with friction surfaces at either end thereof for cooperation with the friction faces on the inner ends of said pinion gears, whereby relative rotation of said side gears will move said mounting blocks into engagement with the respective pinion gears to prevent rotation thereof.

7. The differential of claim 6 wherein said friction faces on said plates are annular in configuration and are disposed on annular raised portions provided on the exterior of said plates, said friction plates being elongated and connected at their ends with provision for relative axial movement, spring means being provided intermediate said ends for biasing said friction plates outwardly.

8. The differential of claim 7 including thrust bearings mounted between said side gears and said casing to permit free relative rotation.

References Cited in the file of this patent
UNITED STATES PATENTS
2,821,096   Lyeth _____ Jan. 28, 1958